United States Patent [19]

Irani

[11] 3,993,736

[45] Nov. 23, 1976

[54] FOOD GRADE PHOSPHORIC ACID FROM WET PROCESS ACID

[75] Inventor: Mazin R. Irani, Tarrytown, N.Y.

[73] Assignee: Stauffer Chemical Company, Westport, Conn.

[22] Filed: Aug. 14, 1975

[21] Appl. No.: 604,519

[52] U.S. Cl. ............................................ 423/321 S
[51] Int. Cl.² ...................................... C01B 25/16
[58] Field of Search .................... 423/305, 307–313, 423/321, 321 S, 490; 204/180 P

[56] References Cited

UNITED STATES PATENTS

| 2,044,940 | 6/1936 | Haag et al. | 423/321 |
| 3,645,682 | 2/1972 | Cochran | 423/321 |
| 3,872,215 | 3/1975 | Cherdron et al. | 423/321 |

FOREIGN PATENTS OR APPLICATIONS

| 1,284,404 | 12/1968 | Germany | 423/321 |
| 1,024,924 | 4/1966 | United Kingdom | 423/321 |
| 467,843 | 6/1937 | United Kingdom | 423/321 |

OTHER PUBLICATIONS

Ionics Bulletin, L–2, 1963, p. 3.

Primary Examiner—Oscar R. Vertiz
Assistant Examiner—Gregory A. Heller
Attorney, Agent, or Firm—Charles B. Rodman

[57] ABSTRACT

A process for purifying wet process phosphoric acid to a food grade phosphoric acid by a sequence of steps including extraction, partial neutralization, dilution with water, contact with activated carbon, neutralization to a pH of from about 5 to about 9, contact with activated carbon, contact with an insoluble alkaline earth metal phosphate salt, reconversion to a purified food grade phosphoric acid, and recovery of the product acid.

26 Claims, 1 Drawing Figure

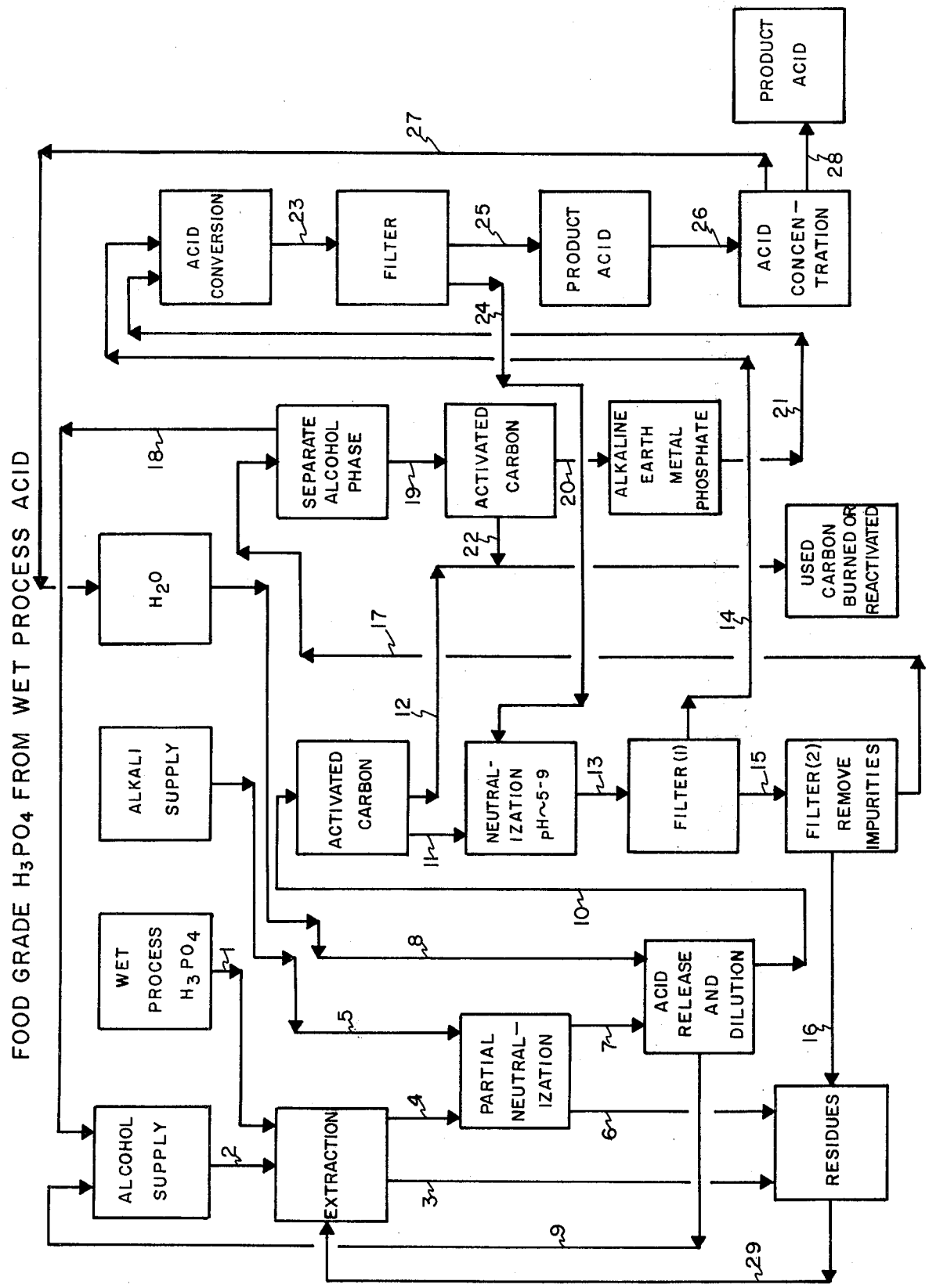

FOOD GRADE PHOSPHORIC ACID FROM WET PROCESS ACID

BACKGROUND OF THE INVENTION

The present invention relates to a process for purifying wet process phosphoric acid, and more particularly, purification of wet process phosphoric acid to a food grade phosphoric acid.

Until recently, all pure phosphoric acid suitable for application in food products was manufactured by the hydration of phosphoric anhydride obtained by the oxidation of elemental phosphorus:

$$P_4 + 5O_2 \rightarrow P_4O_{10}$$

$$P_4O_{10} + 6H_2O \rightarrow 4H_3PO_4$$

In this process, the phosphoric anhydride formed is hydrated immediately in the reactor systems where phosphorus is burned. The acid obtained, known as "thermal acid", is then treated with hydrogen sulfide or sodium hydrosulfide to remove heavy metal impurities as insoluble heavy metal sulfides. After filtration, the acid would be diluted to 75, 80 or 85% $H_3PO_4$ for commercial applications. The drawbacks of the thermal method are the requirement of relatively expensive capital equipment, larger amounts of electrical energy, and pollution control. Because of the wide gap between the price of wet process phosphoric acid and the price of electrothermal acid made from elemental phosphorus, the purification of wet process phosphoric acid has received increasing attention.

The production of "wet process" phosphoric acid by the treatment of phosphate rock with sulfuric acid is well known in the art and is described for example in Waggaman, *Phosphoric Acid, Phosphates and Phosphatic Fertilizers*, at pages 174–209, Hafner Publishing Company (2nd Edition, 1969). The production of wet process phosphoric acid by the treatment of phosphate rock with acids other than sulfuric acid, such as hydrochloric acid and nitric acid is also well known in the art and is described in Slack, *Phosphoric Acid*, Volume 1, Part 2, at pages 889–926, Marcel Dekker, Inc. (1968).

Regardless of what acid is used to produce the wet process phosphoric acid, a considerable amount of dissolved and suspended impurities such as silica, aluminum, magnesium, vanadium, fluorine, chlorine, calcium, arsenic, lead, iron and other organic and inorganic inpurities are contained in the acid. The resulting wet process phosphoric acid contaminated by the aforesaid impurities has relatively limited uses, primarily in the fertilizer industry where such impurities are not only not harmful, but can be considered a desirable source of trace elements.

The prior art does contain methods for purifying wet process phosphoric acid, however, these methods are not entirely satisfactory, primarily due to the fact that they do not produce phosphoric acid as pure as that produced by the well known thermal process. In addition, these prior art processes are costly and tedious, and because of certain steps such as centrifugation, distillation, and the like, which require large amounts of energy and costly equipment, these processes are not economical.

It has, therefore, been an objective of the phosphoric acid industry to provide an efficient economical method for purifying wet process phosphoric acid in order to obtain a product that can be used in foods and pharmaceuticals, with purity as a critical requirement.

*The Food Chemicals Codex*, 2nd Edition (1972), published by the National Academy of Sciences in Washington D.C., has compiled a list of standards for food grade chemicals that have been given official recognition by the Food & Drug Administration. At page 616, requirements for food grade phosphoric acid are set forth as follows:

A colorless, odorless solution of $H_3PO_4$, usually available in concentrations ranging from 75% to 85%. It is miscible with water and with alcohol.

SPECIFICATIONS:
Assay. Not less than the minimum or within the range of percent claimed by the vendor.
Limits of Impurities
Arsenic (as As). Not more than 3 parts per million (0.0003 percent).
Fluoride. Not more than 10 parts per million (0.001 percent).
Heavy Metals (as Pb). Not more than 10 parts per million (0.001 percent).

The present invention has achieved an efficient and commercially economical method for puifying wet process phosphoric acid to food grade acid. It is characterized by high yields, it is not energy dependent and is simple in operation. In addition, all materials can generally be reused after conditioning.

DESCRIPTION OF THE PREFERRED EMBOBODIMENT

In accordance with the present invention, a wet process phosphoric acid having a concentration of from about 40% to about 64% $P_2O_5$ is purified to a food grade phosphoric acid by a sequence of steps including extraction of the wet process acid, partial neutralization, dilution or stripping with water, contact with activated carbon, neutralization to a pH of from about 5 to about 9, contact with activated carbon, contact with an insoluble alkaline earth metal phosphate salt, reconversion to a purified food grade phosphoric acid and recovery of the product acid.

Another advantage of the process of the present invention is its versatility in purifying wet process phosphoric acid produced from either calcined or uncalcined rock. Phosphoric acid prepared from uncalcined phosphate rock (black acid) generally has an organic carbon content of from about 0.1 to about 0.6%, with an average of about 0.3%, by weight. Calcination of the phosphate rock decreases its organic content. It has been found that these organic impurities are soluble in the solvents used in the process of the present invention.

Organic solvents suitable for extracting the wet process phosphoric acid from the aqueous reaction mixture are those that are capable of dissolving concentrated phosphoric acid but which have limited miscibility with water with or without dissolved phosphoric acid.

A representation of solvents suitable for use in the process of the present invention can be ascertained by reference to data on the mutal miscibility of solvents and water, which is well known in the art and is available from the literature, e.g., Seidell, *Solubilities of Organic Compounds*, 3rd Edition, Volume 2, (1941), D.Van Nostrand Company, Inc., New York, N.Y., and Landolt-Bornstein, Physikalisch-Chemische Tabellen, (1912), Julius Springer, Berlin, Germany.

Particular solvents within the above definition are, for example, the lower aliphatic alcohols, ethers, esters and ketones of limited mutual miscibility with water, such as alcohols, including cyclic alcohols, used alone or in mixtures, trialkyl phosphates, particularly those containing 2 to 8 carbon atoms in the individual alkyl groups, such as tributyl phosphate and mixtures thereof.

Where an alcohol is used to contact the wet process phosphoric acid in the initial extraction step, it is preferred to employ an alcohol which contains from 5 to 8 carbon atoms. Alcohols containing 4 carbon atoms such as butyl alcohol can also be used, but their use requires a subsequent upgrading operation for purposes of recycling and reuse. This upgrading operation involves drying, ion exchange, distillation or a combination of the above. On the other hand, alcohols having more than 8 carbon atoms are too viscous and economically impractical to use.

Examples of alcohols containing 5 to 8 carbon atoms suitable for use in the present invention are isoamyl, amyl or n-pentyl, 2 methyl-1-butanol, hexanol, heptanol, octanol, their isomers, and mixtures of the aforesaid alcohols.

The solvent-to-acid weight ratio used in contacting the alcohol with the wet process acid may be varied within the range of from about 4 to 1 to about 1 to 2. It is preferable to operate in the range of about 3 to 1 to about 1 to 1. Most preferable is a weight ratio of about 2 to 1.

The preferred ratios are dictated by a balancing of two opposing effects. Thus, when the relative amount of solvent employed is decreased, the concentration of the acid after stripping with water is increased. This is of course desirable. However, countering this effect, less $P_2O_5$ values are extracted from the feed acid. Therefore, although the $P_2O_5$ concentration of the final stripped product is greater, the total recovery of $P_2O_5$ values would be decreased.

Additionally, the solvent-to-acid ratio has a pronounced effect on the level of impurity rejection. For example, using n-heptanol as the solvent and a 55.7% $P_2O_5$ wet process phosphoric acid, and holding the other variables constant while changing the solvent-to-acid weight ratio from 2 to 1 to 1 to 2, reduces the amount of $P_2O_5$ extracted from 72 to 48% in a single stage extraction. The corresponding impurity rejection is decreased from 64 to 49% for Fe, 68 to 66% for Al and 96 to 85% for Mg.

The impurities removed during the alcohol-acid contacting step include silica, metal phosphates, and gypsum along with some acid. It is to be understood that the term "removal of impurities" as used in the context of this invention, does not necessarily imply total removal.

The contacting of the acid with the alcohol in the extraction step generally occurs at temperatures ranging from about 40° to about 150° F., preferably at about 70° to about 120° F.

In the partial neutralization step, an alkaline reagent is used to partially neutralize the phosphoric acid. The alkaline reagent is added in slight excess of the amount necessary to precipitate metal impurities such as sulfates, and fluosilicates.

In general, it is preferred that an alkali metal hydroxide or carbonate, or ammonia be used, however, the particular alkali metal cation used throughout the process should be consistent. Thus, concentrated sodium hydroxide, dry sodium carbonate, or mixtures thereof can be used. The amount of alkaline reagent employed in the partial neutralization step can vary from about 1 to about 10%, preferably from about 3 to about 7% by weight of the total $P_2O_5$ in the starting acid.

The partially neutralized phosphoric acid is then stripped from the alcohol by dilution with water. This separates the alcohol from the acid. The amount of water used in the dilution or stripping operation is dictated by the concentration of acid in the alcohol-solvent phase, but is generally that amount which will yield an acid having a concentration varying from about 5 to about 30% $P_2O_5$.

The alcohol that is separated can be recycled to the alcohol supply. Diluting the acid to a lower concentration is advantageous in that it lowers its viscosity, makes it easier to work with in the subsequent purification steps and reduces the acid's ability to damage operating equipment.

In general, the partially neutralized acid-to-water weight ratio used in the stripping or dilution step can be varied within the range of about 1 to 1 and about 10 to 1 depending upon the number of stripping stages. A ratio should be chosen which will result in stripping about 90% of the $P_2O_5$ from the alcohol-solvent phase to the aqueous phase. For one, two, or three stage stripping, the preferred ratios are about 2 to 1, 5.5 to 1, and about 6.5–7.5 to 1, respectively.

The stripping or dilution step of the process may be carried out at temperatures of from about 40° to about 150° F., preferably about 70° to about 120° F.

In a preferred embodiment of the process, the partially neutralized acid and water phases are mixed for a period of about 2 to about 15 minutes, most preferably from about 5 to about 10 minutes and then allowed to settle for a period of from about 20 to about 90 minutes.

the diluted phosphoric acid, after separating any suspended particles is contacted with activated carbon. The purpose of the activated carbon contacting step is to remove high molecular weight organic matter such as fatty acids and sulfonic acids which can cause frothing during subsequent purification steps. This high molecular weight organic material is generally present in the uncalcined phosphate rock, and is carried over into the wet process acid. In some cases organic material is also carried over from calcined phosphate rock.

As a general rule, this activated carbon contacting step can be eliminated where the high molecular weight organic content constitutes less than 0.08 weight percent, and most preferably, less than 0.04 weight percent of the original acid.

The activated carbon used to contact the acid can be in the form of a column wherein the acid is passed through, or alternatively, particles of activated carbon can be mixed directly with the acid. When activated carbon particles are mixed directly with the phosphoric acid, they must be separated by either screening, filtration, centrifugation, and the like, before proceeding further.

Recommended flow rates, when operating with a column of activated carbon can vary from about 5 to about 50 milliliters of acid per minute per square inch of column at ambient conditions. Operating at a flow rate of about 15 milliliters per minute per square inch of column is especially preferred. In general, operating at higher temperatures, such as about 60° C increases the efficiency.

The phosphoric acid is next neutralized to a pH varying between about 5 and about 9, preferably between about 6 and about 8, thereby producing a phosphate salt solution.

The purpose of the neutralization step is to produce soluble phosphate salts which stay in solution and which will precipitate undesirable metal salts such as zinc, cadmium, nickel, vanadium, copper, aluminum, magnesium, and the like, in the form of phosphates, carbonates, and hydrated oxides. An additional purpose of the neutralization step is to allow the use of activated carbon in a subsequent step in a manner wherein it will operate most effectively, i.e., in a close to or neutral solution.

In general, the phosphoric acid neutralization can be accomplished in at least three ways. The first approach for neutralizing the phosphoric acid is accomplished by contacting with an alkali such as sodium hydroxide, sodium carbonate, sodium bicarbonate, potassium hydroxide, potassium carbonate, potassium bicarbonate, ammonia, ammonium hydroxide, ammonium carbonate, ammonium bicarbonate, and other equivalent alkalis in amounts sufficient to produce a soluble alkali phosphate in the desired pH range. Anion mixtures of the individual alkali cations can also be used.

The alkali phosphate solution can be a mixture of mono and dialkali phosphates, with their existence and ratio dependent upon the particular pH reached. For example, when an alkali such as sodium carbonate, sodium hydroxide, or mixtures thereof is used to reach a pH of 6.55 at an original $P_2O_5$ concentration of 25%, this will result in a molar ratio of mono- to disodium phosphate of about 1:2.

The crude phosphoric acid can also be neutralized to the proper pH by contacting it with a sodium, potassium, or ammonium-loaded ion exchange resin to raise the pH to form a solution of alkali phosphate salts. The particular alkali cation is chosen in accordance with the alkali phosphate desired.

the contacting of the phosphoric acid with the alkali metal loaded ion exchange resin can occur in a column, or the ion exchange resin particles can be admixed directly with the phosphate salt solution. If direct admixture of the ion exchange resin particles is chosen, then a separation operation is necessary to remove the resin particles before further treatment of the phosphate salt solution can occur. This can be conveniently accomplished by screening, filtration, centrifugation, and the like.

During the contacting of the phosphoric acid with the alkali metal loaded ion exchange resin, hydrogen ions from the phosphoric acid replace the alkali metal ions on the resin, thus converting it from the alkali metal form to a hydrogen loaded form. The ion exchange resin converted to a hydrogen loaded form can be used in a subsequent step for conversion of the alkali phosphate solution back to phosphoric acid.

Alternatively, neutralization of phosphoric acid by means of ion exchange can be accomplished with electrodialysis. The phosphoric acid is placed in a chamber wherein electrolytes are transferred through an ion-selective semi-permeable membrane to accomplish the neutralization by means of electrical energy. This procedure is well known in the art and described, for example, in Kirk-Othmer's *Encyclopedia of Chemical Technology*, 2nd Edition, Volume 7, at pages 846–865 (Interscience 1963).

The undesirable metal salts which have precipitated during the neutralization step can be separated by screening, filtration, centrifugation, or other equivalent means. The resulting phosphate solution is then contacted with activated carbon by means of passage through an activated carbon column, or by direct admixture with activated carbon particles. The purpose of this activated carbon step is to remove high molecular weight organic material that has a tendency to impart an undesirable gray or brown color.

Recommended flow rates, when operating with a column of activated carbon can vary from about 5 to about 50 milliliters of acid per minute per square inch of column at ambient conditions. Operating at a flow rate of about 15 milliliters per minute per square inch of column is especially preferred. In general, operating at higher temperatures, such as about 60° C increases the column efficiency.

The resulting phosphate salt solution is now at a technical grade level and can be used for whatever purpose desired. For example, where the phosphate salt solution comprises mixed sodium phosphates, they can be then used for conversion to sodium tripolyphosphates in a manner well known in the art. However, where the objective is to produce food grade phosphoric acid, the phosphate salt solution must undergo further processing steps.

The alkali phosphate salt solution is then contacted with an insoluble alkaline earth metal phosphate having an alkaline earth metal to phosphorus mole ratio of about 1.4:1 to about 1.8:1. The preferred alkaline earth metals are calcium and magnesium, with calcium being particularly preferred. The calcium phosphates include hydroxy apatite, tricalcium phosphate and mixtures thereof. The analagous magnesium phosphate salts can also be used, and mixtures of both calcium and magnesium salts also function.

An example of an insoluble calcium phosphate salt suitable for use in the present invention is pure hydroxy apatite prepared and used in accordance with the article "Removal of Fluorides from Potable Water by Tricalcium Phosphate," by Adler et al., Volume 30, *Industrial and Engineering Chemistry*, pages 163–165 (1938).

Insoluble alkaline earth metal phosphates are used primarily to lower the fluorine content to food grade levels. Flow rates and contact times depend upon the amount of fluorine present in the solution and the level of fluorine desired in the product. For example, about 10 to about 150 parts per million of fluorine will require about 1 to about 50% tricalcium phosphate, by weight, with about 5 to about 20% tricalcium phosphate being preferred. Contacting times can last for about 1 to about 100 minutes, with about 5 to about 30 minutes being preferred. Longer times can be used, however, no advantage is gained thereby.

The alkaline earth metal phosphates, after use can be separated from the alkali phosphate solution by any convenient means, such as screening, filtration, centrifugation and other equivalent means. The separated alkaline earth metal phosphates can be conveniently regenerated by contacting with a dilute caustic solution, such as 5% NaOH for about one-half hour, separated from the caustic by screening, filtration or centrifugation, and suspended in water. A sufficient amount of an acid is added to the suspension to reach a pH of about 7. Acids such as HCl, $H_2SO_4$, $H_3PO_4$, and $HNO_3$ can be conveniently used. For best results, the acids are usually diluted to a concentration of about 5 to about 10%. The neutral suspension of alkaline earth metal phosphate is separated, worked with water, and is ready for reuse.

The alkali phosphate solution after contact with the alkaline earth metal phosphate is sufficiently pure for food grade applications. In general, it can be recovered, concentrated and crystallized by heating to dryness at a temperature under 250° C.

The alkali phosphate solution can also be reconverted to purified phosphoric acid complying with food grade standards. The reconversion can be effected by contacting the alkali phosphate solution with a hydrogen ion loaded cation exchange resin to convert the alkali phosphates back to phosphoric acid. As discussed earlier, the advantage of this approach is that the alkali metal cationic exchange resin used previously to neutralize the acid becomes converted to a hydrogen ion loaded ion exchange resin which can be recycled to this step for use in the conversion of the phosphate salt solution to phosphoric acid. The hydrogen ion loaded cation exchange resin in converting the phosphate salt solution to phosphoric acid, becomes loaded with the alkali cation of the phosphate salt, and can be recycled to the neutralization step.

For example, if the phosphate salt solution is a mixture of sodium phosphates, the hydrogen ion loaded cation exchange resin becomes a sodium ion loaded cation exchange resin as a result of the conversion of the phosphate salt solution to phosphoric acid. In practice, it has been found that the ion exchange resins can be recycled about 7 times before regeneration has to be performed on the resin. This regeneration is accomplished by contacting the resin with a dilute solution of a strong alkali, such as NaOH, or a dilute solution of a strong acid, such as HCl.

the contacting of the phosphate salt solution with the H$^+$ ion exchange resin can occur in a column, or the ion exchange resin particles can be admixed directly with the phosphate salt solution. If direct admixture of the ion exchange resin particles is chosen, then a separation step is necessary to remove the resin particles. This can be conveniently accomplished by screening, filtration, centrifugation, and the like.

Electrodialysis can also be employed to convert the phosphate salt solution to phosphoric acid. The phosphate salt solution is placed in a chamber wherein electrolytes are transferred through an ion-selective semi-permeable membrane to accomplish conversion of the phosphate salt solution to phosphoric acid by means of electrical energy.

An advantage of the electrodialysis approach is that the neutralization of the crude acid, described earlier, and the conversion of the phosphate salt solution to a purified phosphoric acid can be accomplished in a single vessel with separate chambers and boundaries designated by ion-selective semi-permeable membranes. Useful byproducts such as $H_2$ and $O_2$ can also be recovered from the elecgrodialysis operation.

Alternatively, conversion of the phosphate salt solution can be accomplished by contacting the phosphate salt solution with a mineral acid such as sulfuric acid, hydrochloric acid or nitric acid. It is preferred that sulfuric acid be used for converting the phosphate salt solution to phosphoric acid since insoluble sulfates are formed during the conversion. Soluble and excess sulfate ions can be easily removed by precipitation with a barium compound, such as barium hydroxide.

The use of hydrochloric acid or nitric acid is less desirable due to the fact that their use results in the formation of soluble chlorides or soluble nitrates which are more difficult to remove. A final separation step is employed if necessary, to remove any residual suspended particles.

The phosphoric acid solution, now in its product state, is filtered, concentrated, for example, by heating, and is sufficiently pure for grade applications.

The process will now be described with reference to the attached FIGURE which is a schematic flow plan of the process.

Wet process phosphoric acid from stream 1 is contacted with an alcohol of from about 5 to about 8 carbon atoms flowing through stream 2 into an extraction unit. The residue raffinate phase exiting at stream 3 is semi-liquid/semi-solid in composition and contains silica, metal phosphates, gypsum and some phosphoric acid. Stream 3 is conveniently collected in a residue collection area, wherein the residues may be further processed and the useful values recovered. The alcohol-acid phase exiting at stream 4 is partially neutralized by contacting with a sufficient amount of a concentrated alkali, such as sodium hydroxide or dry soda ash, passing through stream 5 into the partial neutralization unit to precipitate metal impurities including iron, aluminum, magnesium, calcium, heavy metal fluorides, and sulfates which are separated in stream 6, which passes to the residue collection area. The partially neutralized acid-alcohol extract in stream 7, free of most metal impurities and other residues, is contacted with water from stream 8 to form an aqueous phosphoric acid phase and an alcohol phase. The resultant phosphoric acid phase can also contain a small amount of alcohol. The separated alcohol phase is recycled through stream 9 to the alcohol supply and the aqueous phosphoric acid phase exits in stream 10 for treatment by contacting with activated carbon. The activated carbon treatment removes high molecular weight organic impurities, and can be omitted where the high molecular weight organic content is less than 0.08% in the original acid. The phosphoric acid exits the activated carbon treatment in stream 11 and is contacted with an alkali loaded cation exchange resin (form 1), such as Na$^+$, to neutralize to a pH of between about 5 and about 9, thereby forming a mixed sodium phosphate solution. This neutralization step can also be accomplished by means of a concentrated alkali or electrodialysis, as described earlier. The spent carbon from the activated carbon treatment exits through stream 12 to a reactivation zone or is burned. The now hydrogen ion loaded cation exchange resin (form 2) and insoluble impurities, along with the sodium phosphate solution, exit from the ion exchange treatment via stream 13 to a two-step filtration operation. In the first filtration step, the hydrogen loaded cation exchange resin is separated by screening and passes through stream 14 to another ion exchange area to be used for subsequent conversion of sodium phosphates to phosphoric acid. Stream 15 exiting from the first step filtration operation proceeds to a second filtration step wherein insoluble impurities are removed via stream 16 to the residue collection area. These impurities include metal phosphates and other insoluble material. A clear filtrate containing a sodium phosphate solution exits the second filtration step at stream 17 and comprises a mixed sodium phosphate solution phase and possibly some alcohol which, if present, appears in a separate alcohol phase. The alcohol phase is separated and conveniently recycled through stream 18 to the alcohol supply. The alcohol-free sodium phosphate slution proceeds through stream 19 to another activated carbon treatment. The contacting of the mixed sodium phosphate solution with the activated carbon serves to remove any final traces of organics along with any remaining alcohol. The spend activated carbon exits via stream 22 to be reactivated or burned. The mixed sodium phosphate solution exits through stream 20 and is contacted with an insoluble alkaline earth metal phosphate salt, such as tricalcium phosphate, which serves to remove any remaining soluble fluorine ions. The mixed sodium phosphate solution then proceeds via stream 21 to the acid conversion wherein a hydrogen ion loaded ion exchange resin (form 2) converts the sodium phosphate solution to phosphoric acid, and in turn becomes a sodium loaded ion exchange resin (form 1). Phosphoric acid and the sodium loaded resin proceed through stream 23 through a screening filtration operation wherein the sodium ion loaded resin is filtered and recycled via stream 24 to a neutralization area for contacting stream 11.

The reconversion to phosphoric acid step can also be accomplished by means of a mineral acid or electrodialysis, as described eariler. The filtered phosphoric acid passes through stream 25 to a product acid area. This acid has a concentration of about 15 to about 25% $P_2O_5$. The phosphoric acid proceeds through stream 26 to an acid concentration area, wherein the acid can be conveniently concentrated by heating under vacuum. The water removed during the concentration step can be recycled to the water supply via stream 27. Any color that exists in the concentrated phosphoric acid can be removed by the use of activated or decolorizing carbon. The product acid exiting stream 28 complies with food grade phosphoric acid specifications. Any supernatant liquid in the residue collection area is primarily phosphoric acid and can be recycled to the extraction unit via stream 29.

The following examples more particularly illustrate the invention. All parts and percentages are by weight, unless otherwise noted.

EXAMPLE 1

500 grams of a wet process phosphoric acid containing 54% $P_2O_5$, 5.29% $SO_3$, 0.02% organic matter, 0.65% Fe, 0.94% Mg, 0.54% Al, 25 ppm Ca and 0.37% F was extracted with 1000 grams of isoamyl alcohol producing an alcohol-acid phase I and an aqueous raffinate phase II. The phases were separated. Phase I was contacted with 15.5 grams of a 50% NaOH solution. A phase separation resulted in the formation of an alcohol-acid phase III and an aqueous phase IV containing precipitated impurities. Phases III and IV were separated. 580 ml. of water was added to Phase III. Two phases appeared: An alcohol phase V and an aqueous acidic phase VI. The alcohol phase V was recycled into step one above. Solution VI was passed over an activated carbon column of 4ft. ×2in. at a rate of 50 ml/min at ambient conditions. The resulting solution VII was passed over a Na$^+$ loaded ion exchange resin (form I) until the pH of the resulting solution VIII became 7.0. The resin was converted into a(form II)H$^+$ loaded ion exchange resin and was separated by screening and washed with 50 ml. of water. The wash-water was combined with solution VIII which contained a fine greenish-gray pricipitate IX consisting mainly of insoluble metal phosphates. Precipitate IX was filtered, giving a water white solution containing a mixture of mono- and disodium phosphates. Precipitate IX, aqueous phase IV (with the precipitate in it) and raffinate phase II were combined. The supernatant liquid from the combination of wash water, solution VIII and precipitate IX consisting mainly of phosphoric acid having a $P_2O_5$ concentration of about 25% was recycled into the first extraction step. Solution X was passed over an activated carbon column and then contacted with an insoluble calcium phosphate salt and filtered yielding a filtrate solution XII containing a mixture of mono- and disodium phosphate. Solution XII was passed over an H$^+$ ion exchange resin in form II which was converted into reusable form I. The product acid solution XIII from the ion exchange contacting was concentrated by heating to 54% $P_2O_5$ and contained less than 2ppm Pb, less than 1.5 ppm As, less than 10 ppm $SO_3$, 4.8 ppm F, 5.2 ppm Fe, 16 ppm Ca, less than 5 ppm Mg and less than 5 ppm organic matter. The yield was 91% of the total $P_2O_5$ in the starting acid.

EXAMPLE 2

300 grams of a wet process phosphoric acid containing 54% $P_2O_5$, 6.5% $SO_3$, 0.24% organic matter, 0.37% Fe, 0.12% Mg, 0.46% Al, 41 ppm Ca and 0.96% F was extracted with 600 grams of isoamyl alcohol producing an alcohol-acid phase I and an aqueous raffinate phase II. The phases were separated. Phase I was treated and contacted with 9.1 grams of a 50% NaOH solution. A phase separation resulted in the formation of an alcohol-acid phase III and an aqueous phase IV containing precipitated impurities. Phases III and IV were separated. 370 ml of water was added to Phase III. Two phases appeared: An alcohol phase V and an aqueous acidic phase VI. The alcohol phase V was recycled into step one above. Solution VI was passed over an activated carbon column of 4 ft. ×2 in. (from Calgon) at a rate of 50 ml/min at ambient conditions. The resulting solution VII was passed over a Na$^+$ loaded cation exchange resin (form I) until the pH of the resulting solution VIII became 7.0. The resin was converted into a(form II)H$^+$ loaded resin and was separated by screening and washed with 50 ml of water. The wash-water was combined with solution VIII which contained a fine greenish-gray precipitate IX consisting mainly of insoluble phosphates. Precipitate IX, aqueous phase IV (with the precipitate in it) and raffinate phase II were combined to form phase X. The supernatant liquid in phase X was recycled into the first extraction step. Solution VIII, containing a mixture of mono- and disodium phosphates was passed over an activated carbon column, contacted with an insoluble calcium phosphate salt and filtered, yielding a filtrate solution XI containing the mono- and disodium phosphates. Solution XI was passed over the ion exchange resin in form II which was converted into reusable form I. The product acid solution XII was concentrated to 54% $P_2O_5$ by heating, and contained less than 2 ppm Pb, less than 1.5 ppm As, less than 10 ppm $SO_3$, 4.4 ppm F. 5.0 ppm Fe, 18 ppm Ca, less than 5 ppm Mg and less than 5 ppm organic matter. The yield was over 91% of the total $P_2O_5$ in the starting acid.

What is claimed is:

1. A process for the preparation of high purity phosphoric acid from wet process phosphoric acid which comprises:

a. contacting a wet process phosphoric acid with an organic solvent capable of extracting said acid to form a solvent-acid phase and a raffinate phase;

b. partially neutralizing the solvent-acid phase by contacting with a concentrated alkali in amounts sufficient to precipitate impurities, and separating said impurities;

c. diluting said partially neutralized solvent-acid phase with water to strip a dilute aqueous phosphoric acid phase from said solvent phase, and separating said phosphoric acid phase;

d. neutralizing the aqueous phosphoric acid to a pH of between about 5 and about 9, thereby forming a solution of soluble salts of phosphoric acid, and a precipitate, and separating said precipitate;

e. contacting said solution of soluble salts with activated carbon;

f. contacting said solution of soluble salts with an insoluble alkaline earth metal phosphate salt and separating said insoluble salt;

g. converting said solution of soluble salts to high purity phosphoric acid.

2. The process of claim 1, step (a) wherein said solvent is an alcohol containing 5 to 8 carbon atoms.

3. The process of claim 1, step (a), wherein the raffinate phase is separated prior to partial neutralization.

4. The process of claim 1, step (b), wherein said alkali is selected from the group consisting of sodium hydroxide, sodium carbonate, and mixtures thereof; potassium hydroxide, potassium carbonate, and mixtures thereof; and ammonia, ammonium hydroxide, ammonium carbonate, and mixtures thereof.

5. The process of claim 4 wherein said alkali is selected from the group consisting of sodium hydroxide, sodium carbonate and mixtures thereof.

6. The process of claim 1, step (c), wherein said aqueous phosphoric acid phase, after separating said solvent phase, is contacted with activated carbon.

7. The process of claim 1, step (d) wherein said neutralization is accomplished by contacting said acid with an alkali selected from the group consisting of sodium hydroxide, sodium carbonate, sodium bicarbonate, and mixtures thereof; potassium hydroxide, potassium carbonate, potassium bicarbonate, and mixtures thereof; ammonia, ammonium hydroxide, ammonium bicarbonate, ammonium carbonate, and mixtures thereof.

8. The process of claim 7 wherein said alkali is selected from the group consisting of sodium hydroxide, sodium carbonate, sodium bicarbonate and mixtures thereof.

9. The process of claim 1, step (d) wherein said neutralization is accomplished by contacting said acid with an ion exchange resin loaded with an alkali metal cation selected from the group consisting of sodium, potassium, and ammonium.

10. The process of claim 1, step (d), wherein said pH varies from about 6 to about 8.

11. The process of claim 1, step (d) wherein said neutralization is accomplished by means of electrodialysis.

12. The process of claim 1, step (f), wherein said alkaline earth metal phosphate salt is selected from the group consisting of calcium, magnesium and mixtures thereof.

13. The process of claim 12 wherein said insoluble alkaline earth metal phosphate salt has an alkaline earth metal to phosphorus mole ratio varying from about 1.4:1 to about 1.8:1.

14. The process of claim 13 wherein said alkaline earth metal phosphate is a calcium salt selected from the group consisting of hydroxy apatite, tricalcium phosphate, and mixtures thereof.

15. The process of claim 1 wherein the supernatant liquid from the residues of steps (a), (b), and (d) is recycled to the solvent-acid contacting.

16. The process of claim 1, step (d), wherein said soluble salts undergo a phase separation prior to the activated carbon contacting.

17. The process of claim 1, step (d), wherein said acid has been diluted to a concentration varying from about 5% to about 30% $P_2O_5$.

18. The process of claim 1, step (c), wherein said solvent phase is recycled to the solvent supply.

19. The process of claim 2 wherein said solvent is selected from the group consisting of amyl alcohol, 2-methyl-1-butanol, hexanol, heptanol, octanol, isomers, and mixtures thereof.

20. The process of claim 1, step (g) wherein the conversion to a purified phosphoric acid is accomplished with a mineral acid.

21. The process of claim 20 wherein said mineral acid is sulfuric acid.

22. The process of claim 1, step (g) wherein the conversion to a purified phosphoric acid is accomplished with a hydrogen loaded cation exchange resin.

23. The process of claim 9 wherein said alkali metal cation exchange resin after neutralization is recycled to the acid conversion step for use as the hydrogen ion loaded cation exchange resin.

24. The process of claim 22 wherein said hydrogen ion loaded cation exchange resin is recycled for use in the neutralization step as the alkali cation exchange resin.

25. The process of claim 1, step (g) wherein the conversion to a purified phosphoric acid is accomplished with electordialysis.

26. The process of claim 1 wherein said high purity phosphoric acid complies with food grade requirements.

* * * * *